(12) United States Patent
Yamaguchi

(10) Patent No.: US 10,353,140 B2
(45) Date of Patent: Jul. 16, 2019

(54) BACKLIGHT UNIT AND DISPLAY DEVICE

(71) Applicant: SHARP KABUSHIKI KAISHA, Sakai, Osaka (JP)

(72) Inventor: Katsuhiro Yamaguchi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/738,395

(22) PCT Filed: Jun. 20, 2016

(86) PCT No.: PCT/JP2016/068220
§ 371 (c)(1),
(2) Date: Dec. 20, 2017

(87) PCT Pub. No.: WO2016/208528
PCT Pub. Date: Dec. 29, 2016

(65) Prior Publication Data
US 2018/0180799 A1     Jun. 28, 2018

(30) Foreign Application Priority Data

Jun. 26, 2015 (JP) .................................. 2015-128475

(51) Int. Cl.
*G02F 1/1333* (2006.01)
*F21V 8/00* (2006.01)
*G02F 1/13357* (2006.01)
*G09F 9/00* (2006.01)
*G02F 1/1335* (2006.01)

(52) U.S. Cl.
CPC ......... *G02B 6/0088* (2013.01); *G02F 1/1336* (2013.01); *G02F 1/133308* (2013.01); *G02F 1/133528* (2013.01); *G02F 2001/133311* (2013.01); *G02F 2001/133314* (2013.01); *G02F 2001/133317* (2013.01); *G02F 2001/133322* (2013.01); *G09F 9/00* (2013.01)

(58) Field of Classification Search
CPC ........ G02F 2001/133314; G02F 2001/133317; G02F 1/133308
USPC ..................................................... 349/58, 60
See application file for complete search history.

(56) References Cited

U.S. PATENT DOCUMENTS

| 2008/0094535 A1* | 4/2008 | Suh .................. G02B 6/0088 349/58 |
| 2010/0201908 A1* | 8/2010 | Ishida .............. G02F 1/133308 349/58 |
| 2013/0057801 A1* | 3/2013 | Park ................ G02F 1/133308 349/58 |

FOREIGN PATENT DOCUMENTS

JP          2011-157554 A          8/2011

* cited by examiner

*Primary Examiner* — Edmond C Lau
(74) *Attorney, Agent, or Firm* — ScienBiziP, P.C.

(57) ABSTRACT

A backlight unit is provided with: LEDs; optical sheets including a light exiting surface through which light rays from the LEDs exit; a housing member housing the LEDs and the optical sheets, the housing member including an annular panel mounting surface and a recessed portion recessed in the panel mounting surface, the annular panel mounting surface surrounding the light exiting surface and having a liquid crystal panel mounted thereto; and a fixing tape having an annular configuration comprising a plurality of longitudinal unit fixing tapes joined to each other, the unit fixing tapes having fixing surfaces on front and rear surfaces thereof, wherein one fixing surface is fixed to the panel mounting surface, and the plurality of unit fixing tapes are joined at positions overlapping with recessed portions.

11 Claims, 12 Drawing Sheets

BACKLIGHT UNIT AND DISPLAY DEVICE

TECHNICAL FIELD

The present invention relates to a backlight unit and a display device.

BACKGROUND ART

As a display unit for images and the like, a liquid crystal display device is known in which a liquid crystal panel is used. Because the liquid crystal panel is not provided with its own light emitting function, the liquid crystal display device is provided with a backlight unit for illuminating light from the back side of the liquid crystal panel.

Patent Document 1 indicated below discloses a liquid crystal display device in which a liquid crystal display module unit and a backlight unit are fixed to each other with a frame-shaped reflective and light-blocking adhesive tape.

PRIOR ART DOCUMENT

Patent Document

Patent Document 1: Japanese Translation of PCT International Application Publication No. 2011-157554

Problem to be Solved by the Invention

When a frame-shaped (annular) fixing member, such as the reflective and light-blocking adhesive tape (fixing member) disclosed in Patent Document 1, is used, an inner portion of the fixing member has to be discarded when the fixing member is formed. This leaves room for improvement in terms of reducing discarded material. In addition, an annular fixing member is difficult to be accurately disposed with respect to the backlight unit, also leaving room for improvement in that respect. These issues may be addressed by adopting a fixing member which is configured in an annular shape by simply joining a plurality of longitudinal portions. In this case, however, the joint portions become thicker than the other portions. As a result, it becomes difficult to ensure flatness of the fixing surface of the fixing member, resulting in the problem of failure to fix the liquid crystal panel to the fixing member with sufficient bonding force.

The manufacture of the liquid crystal display device includes a step of affixing a liquid crystal panel to the backlight unit with the fixing member attached thereto. In this case, before the step of affixing the liquid crystal panel, the light exiting surface of the backlight unit positioned inwardly of the fixing member needs to be protected from foreign matter, such as dust, when handling the backlight unit (such as for storage or transfer). The entry of such foreign matter may be suppressed, for example, by attaching a protection member to the fixing member so as to cover the light exiting surface of the backlight unit. However, even when the protection member is provided, if the fixing member is disposed on the backlight unit such that a gap exists, foreign matter may enter on the light exiting surface side via the gap, thereby causing a problem.

DISCLOSURE OF THE PRESENT INVENTION

The present invention has been made in view of the above circumstances, and an object of the present invention is to protect a backlight unit and to make the bonding force of a panel with respect to the backlight unit sufficient.

Means for Solving the Problem

A backlight unit according to the present invention includes a light source; an optical member having a light exiting surface through which light from the light source exits; a housing member housing the light source and the optical member, the housing member including an annular panel mounting surface and a recessed portion recessed in the panel mounting surface, the annular panel mounting surface surrounding the light exiting surface and having a panel mounted thereto which is irradiated with the light from the light exiting surface; and a fixing member for fixing the panel to the housing member, the fixing member being configured in an annular shape comprising a plurality of longitudinal unit fixing members joined to each other, the unit fixing members having fixing surfaces on front and rear surfaces thereof, wherein one of the fixing surfaces is fixed to the panel mounting surface, and the plurality of unit fixing members are joined at a position overlapping with the recessed portion.

In the backlight unit of the present invention, because the fixing member comprises longitudinal unit fixing members joined in an annular shape, the material that would be discarded in forming the fixing member can be decreased, and the fixing member can be accurately disposed with respect to the housing member. In addition, because the longitudinal unit fixing members are joined in an annular configuration, the fixing members are not susceptible to the formation of a gap, and the problem of foreign matter becoming attached to the light exiting surface positioned inwardly of the fixing member can be suppressed. Moreover, the unit fixing members are joined at the position overlapping with the recessed portion of the panel mounting surface. Accordingly, the other fixing surface of the fixing member (the fixing surface affixed to the panel) can be made flat, such that the panel can be affixed to the housing member in a preferable manner.

Embodiments of the method for manufacturing the display device according to the present invention may include the following preferable configurations.

(1) The panel may have a polygonal shape; the panel mounting surface may include a plurality of side portions extending along a side portion of the panel; the recessed portion may be provided at a corner portion between one side portion of the panel mounting surface and another side portion adjacent to the one side portion; and, among the plurality of unit fixing members of the fixing member, one unit fixing member may be disposed on the one side portion, and another unit fixing member may be disposed on the other side portion. In this configuration, one unit fixing member and the other unit fixing member can be respectively arranged in a straight line shape along one side portion and the other side portion. Accordingly, the fixing members can be accurately disposed with respect to the panel mounting surface, and the other fixing surface can be made flat in a preferable manner.

(2) The recessed portion may be provided for each corner portion of the panel mounting surface; and the plurality of unit fixing members of the fixing member may be disposed on each of the side portions of the panel mounting surface. In this configuration, the annular configuration in which the fixing members extend along the panel mounting surface having a polygonal side portion can be achieved in a preferable manner.

(3) The one unit fixing member and the other unit fixing member of the fixing member each may have an oblong tape shape in a plan view, and may be overlapped, with the corner portions thereof being aligned with each other, in an overlapping area that is rectangular in a plan view; and the recessed portion may have a rectangular shape in a plan view so as to accommodate at least a part of the overlapping area. In this configuration, a sufficient overlapping margin for one unit fixing member and the other unit fixing member can be ensured. Because the overlapping area is accommodated in the recessed portion having the same shape in a plan view, the development of a gap between the fixing member and the panel mounting surface due to the provision of the recessed portion can be suppressed.

(4) The recessed portion may have a depth dimension equivalent to a thickness dimension of the unit fixing member among the plurality of unit fixing members that is disposed on the panel mounting surface side. In this configuration, the other fixing surface of the fixing member can be made flat in a preferable manner.

(5) The housing member may include a bottom plate portion on which the optical member is mounted, and a frame-shaped side wall portion rising from an outer peripheral end portion of the bottom plate portion; and the panel mounting surface may be formed on a surface of the side wall portion on the opposite side from the bottom plate portion. In this configuration, the configuration of the panel mounting surface extending around the light exiting surface of the optical member in the housing member can be achieved in a preferable manner.

(6) The side wall portion may include a frame-shaped panel-side side wall portion rising from the panel mounting surface and surrounding the panel. In this configuration, because the panel-side side wall portion is disposed so as to surround the outer periphery of the fixing member, foreign matter, such as dust, that would move inwardly into the housing member can be blocked by the panel-side side wall portion, and the problem of foreign matter becoming attached to the light exiting surface can be suppressed in a preferable manner.

A display device according to the present invention may include the backlight unit; and a display panel which is the panel attached to the panel mounting surface and which provides a display using the light from the backlight unit.

In the display device according to the present invention, during the manufacture of the display device having the backlight unit and the display panel affixed to each other, the problem of foreign matter becoming attached to the light exiting surface of the backlight unit can be suppressed in a preferable manner. In addition, because the other fixing surface of the fixing member (the fixing surface affixed to the panel) is flat, the panel can be affixed to the housing member in a preferable manner.

Embodiments of the display device according to the present invention may preferably include the following configurations.

(1) The display panel may include a glass substrate, and a polarizing plate attached to a surface of the glass substrate on the backlight unit side; and the fixing member may have the other fixing surface fixed to the glass substrate. Generally, a glass substrate has a smoother plate surface than a polarizing plate. Accordingly, in the configuration, a sufficient bonding force of the fixing member with respect to the display panel can be obtained.

(2) The display panel may include a glass substrate, and a polarizing plate attached to a surface of the glass substrate on the backlight unit side; and the fixing member may have the other the fixing surface fixed to the polarizing plate. Generally, a polarizing plate has a poor surface smoothness compared with a glass substrate. Accordingly, when the fixing member is fixed to the polarizing plate, the adhesive strength per unit area of the fixing member may be decreased compared with when fixed to the glass substrate. According to the fixing member of the present invention, the flatness of the other fixing surface is ensured, whereby a sufficient bonding force of the fixing member with respect to the polarizing plate can be obtained. The configuration in which the polarizing plate is disposed close to the edge of the outer peripheral end portion of the display panel contributes to narrowing the frame of the display device.

(3) The display panel may be a liquid crystal panel, by way of example. The display device can be preferably applied as a liquid crystal display device for various uses, such as in a portable information terminal.

Advantageous Effect of the Invention

According to the present invention, the backlight unit can be protected, and a sufficient bonding force of the panel with respect to the backlight unit can be obtained.

BEST MODE FOR CARRYING OUT THE INVENTION

<First Embodiment>

A first embodiment of the present invention will be described with reference to FIG. 1 to FIG. 6. In the present embodiment, a liquid crystal display device 10 and a backlight unit 20 will be described.

Figure 1:
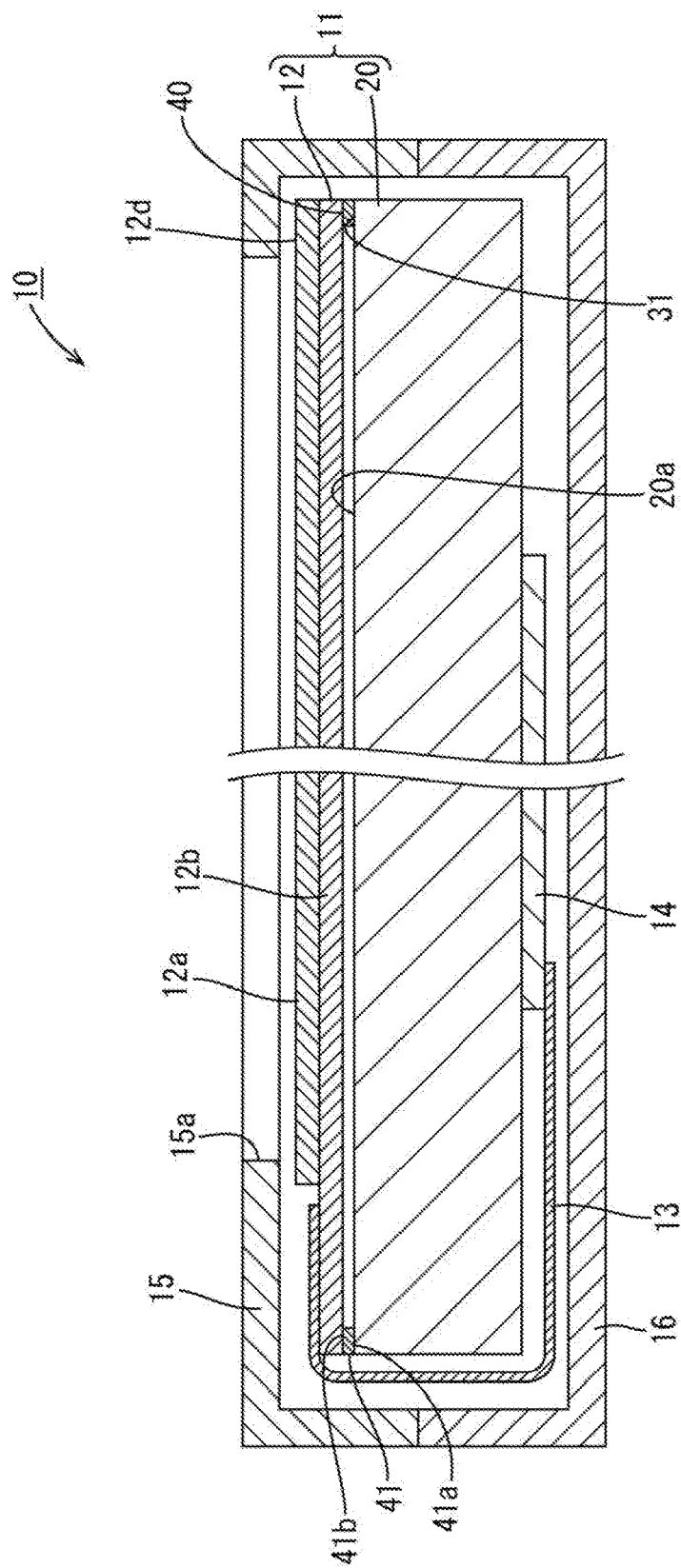
FIG. 1 is a cross sectional view of a liquid crystal display device according to the first embodiment of the present invention.

The liquid crystal display device 10, as illustrated in FIG. 1, has a configuration which includes a liquid crystal module 11 as a main component. The liquid crystal display device 10 is provided with a pair of front and rear exterior members 15, 16 for accommodating the liquid crystal module 11. The exterior member 15 on the front side is formed with an opening portion 15a for enabling an image being displayed on the liquid crystal panel 12 to be viewed externally. The use of the liquid crystal display device 10 is not particularly limited, and may be utilized in various electronic devices (not illustrated) including: portable telephones (including smartphones); laptop personal computers (including tablet personal computers); portable information terminals (including electronic books and PDAs); digital photo frames; portable gaming machines; vehicle navigation systems; and instrument panels. The screen size of the liquid crystal panel 12 is not particularly limited, and may be set to the order of several inches to more than 10 inches, for example.

Figure 2:
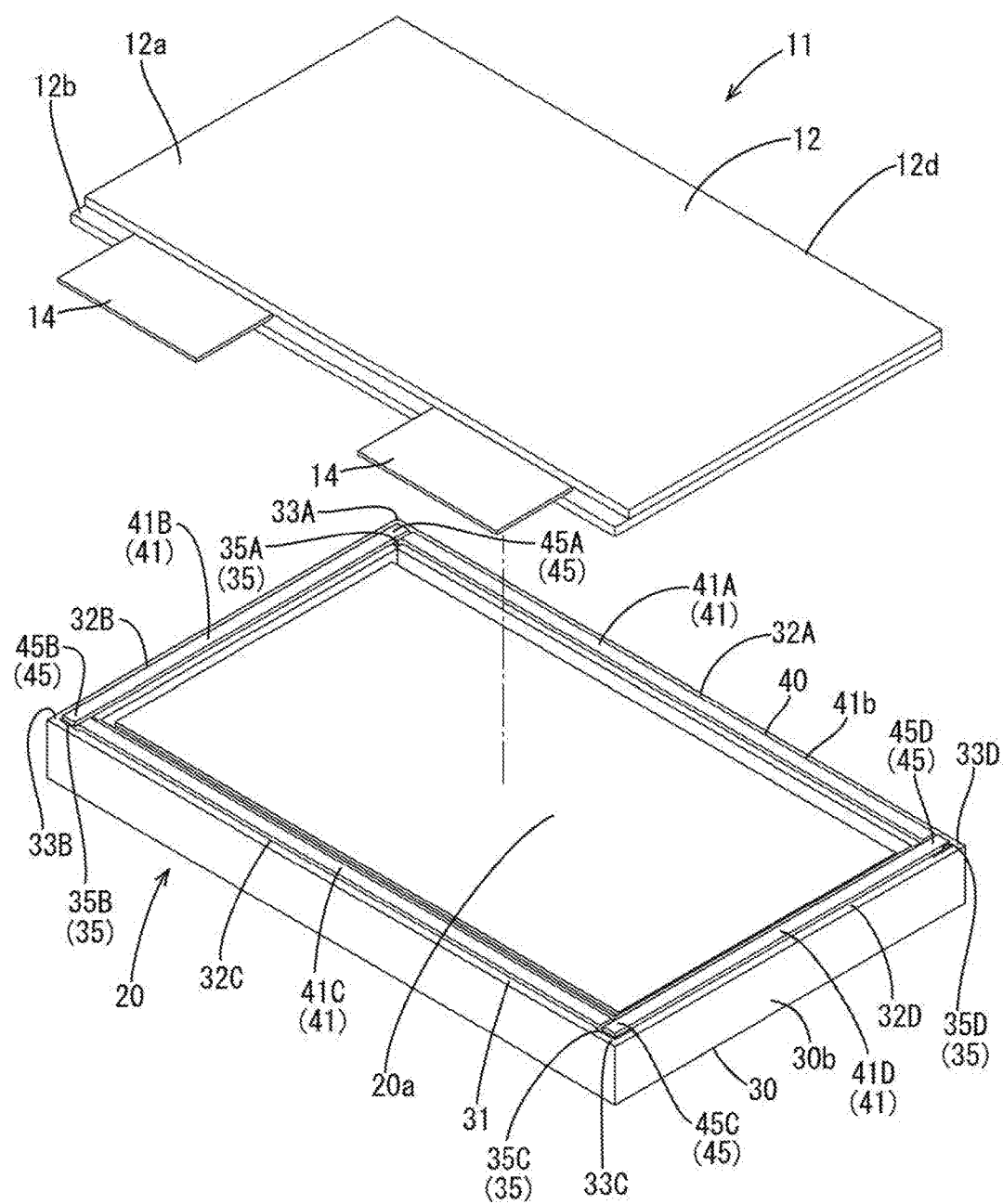
FIG. 2 is an exploded perspective view of a liquid crystal module configuring the liquid crystal display device of FIG. 1.

The liquid crystal module 11, as illustrated in FIG. 2, is generally rectangular in a plan view. The liquid crystal module 11 is provided with a liquid crystal panel 12 which is rectangular in a plan view, and a backlight unit (illuminating device) 20 which is rectangular in a plan view. The liquid crystal module 11 has an integral configuration in which the liquid crystal panel 12 is attached to a fixing tape 40 attached to the backlight unit 20.

The liquid crystal panel 12 provides a display by utilizing light from the backlight unit 20. The liquid crystal panel 12, as illustrated in FIG. 1 and FIG. 2, is provided with: a pair of transparent (configured to have light transmission) substrates 12a, 12b made of glass; and a liquid crystal layer interposed between the substrates 12a and 12b, and including liquid crystal molecules of a substance of which the optical characteristic is varied by electric field application. The substrates 12a, 12b are affixed to each other by a sealing material with a gap corresponding to the thickness of the liquid crystal layer being maintained. The pair of substrates 12a, 12b is the color filter substrate 12a and the array substrate 12b. In the present embodiment, the array substrate 12b is set to be larger than the color filter substrate 12a, such that the end portion of a part of the array substrate 12b juts out beyond the color filter substrate 12a. The jutting portion of the array substrate 12b is provided with a terminal portion (not illustrated). A flexible substrate 13 and a control circuit substrate 14 for supplying various signals for displaying an image are mounted so as to be connected to the terminal portion. On the outer surface side of each of the substrates 12a, 12b, a polarizing plate 12c (see FIG. 5) is attached.

Figure 3:
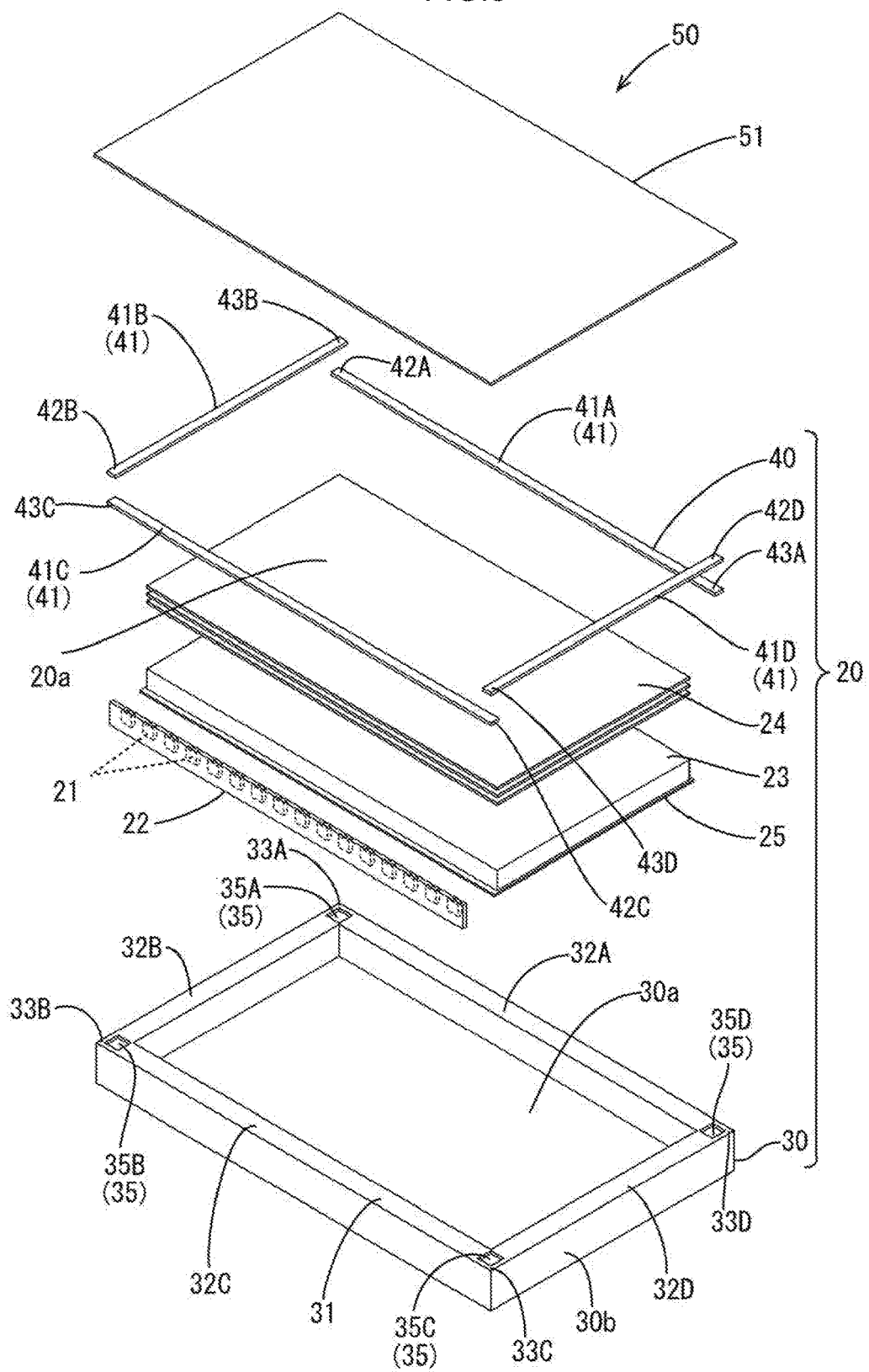
FIG. 3 is an exploded perspective view of a backlight unit package.
Figure 4:
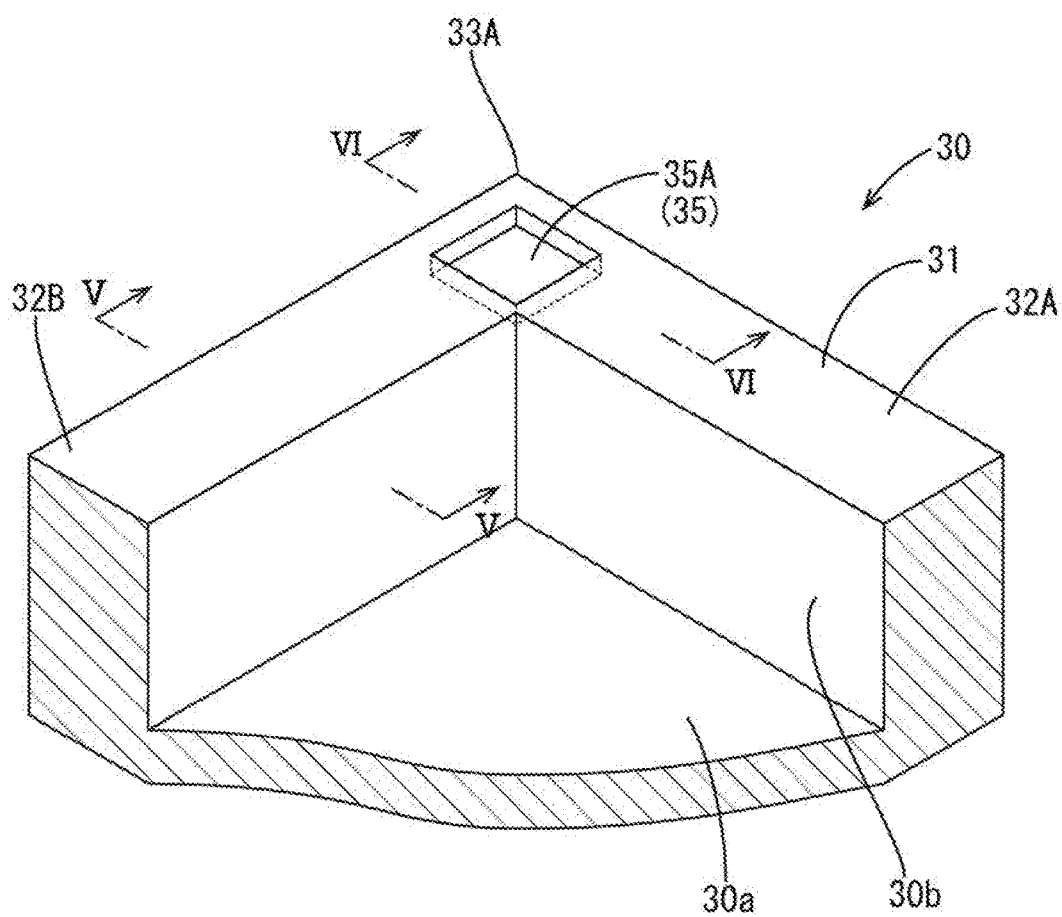
FIG. 4 is a perspective view around a corner portion of a housing member.

The backlight unit 20, as illustrated in FIG. 2, has a generally panel-like shape (generally block-shaped) as a whole similar to the liquid crystal panel 12 in outer shape. The backlight unit 20, as illustrated in FIG. 3, is provided with: light emitting diodes (LED) 21 providing a light source; a LED substrate (light source substrate) 22 on which the LEDs 21 are mounted; a light guide plate 23 which guides light rays from the LEDs 21; a plurality of optical sheets (optical member) 24 stacked and arranged on the light guide plate 23; and a housing member 30 in which the LED substrate 22, the light guide plate 23, and the optical sheets 24 are housed. The backlight unit 20 is of the edge-lit type (side-lit type) in which the LEDs 21 (LED substrate 22) are unevenly disposed at one end portion in the short-side direction of the outer peripheral portion of the backlight unit 20. The backlight unit 20 has a light exiting surface 20a on the side that is affix to the liquid crystal panel 12.

The LEDs 21, as illustrated in FIG. 3, has a configuration in which LED chips are encapsulated by resin material on a substrate portion fixed on the LED substrate 22. The LED substrate 22 has a longitudinal plate shape extending along the long-side direction of the light guide plate 23, and is disposed with the plate surface thereof being orthogonal to the plate surfaces of the liquid crystal panel 12 and the light guide plate 23.

The light guide plate 23, as illustrated in FIG. 3, is made from a generally transparent (highly light transmissive) synthetic resin material (such as acrylic) with a refractive index sufficiently higher than air. The light guide plate 23 has a flat, horizontally long rectangular plate shape in a plan view similar to the liquid crystal panel 12, with the plate surface being parallel with the plate surface of the liquid crystal panel 12. The light guide plate 23 is disposed directly under the liquid crystal panel 12 and the optical sheets 24. The light guide plate 23 has outer peripheral end surfaces of which one end portion surface in the long-side direction is opposed to the LEDs 21 on the LED substrate 22. The light guide plate 23 has the function of introducing light emitted from the LEDs 21 via the long-side end surface, and directing the light to travel upward toward the optical sheets 24 (front side, light exiting side) and to exit through the front surface while allowing the light to propagate therein. On the rear surface side of the light guide plate 23 (opposite side from the side of the optical sheets 24), a reflection sheet 25 for reflecting the light from the light guide plate 23 on the rear surface side is disposed.

The optical sheets 24, as illustrated in FIG. 3, has a horizontally long rectangular shape in a plan view, similar to the liquid crystal panel 12 and the light guide plate 23. The optical sheets 24 are interposed between the liquid crystal panel 12 and the light guide plate 23. The optical sheets 24 transmits the light from the light guide plate 23, and directs the transmitted light toward the liquid crystal panel 12 while providing the transmitted light with a predetermined optical action. The optical sheets 24 comprise a plurality of sheets (three sheets in the present embodiment) that are stacked upon each other. In the present embodiment, the optical sheets 24 constitute the light exiting surface 20a of the backlight unit 20.

The housing member 30 is made from synthetic resin, and includes, as illustrated in FIG. 3: a bottom plate portion 30a on which the reflection sheet 25, the light guide plate 23, and the optical sheet (optical member) 24 are mounted; and a frame-shaped side wall portion 30b rising from the outer peripheral end portions of the bottom plate portion 30a. In other words, the housing member 30 has a shallow-bottomed box shape (shallow tray-like shape) opening toward the liquid crystal panel 12. The housing member 30 serves as a chassis forming the outermost shell of the backlight unit 20. The housing member 30 ensures the rigidity of the backlight unit 20, and suppresses the entry of foreign matter and the like into the backlight unit 20.

The side wall portion 30b, as illustrated in FIG. 3, provides the function of holding, within the frame thereof, the LED substrate 22, the light guide plate 23, and the optical sheets 24. The side wall portion 30b extends along an outer peripheral end portion (side portion) 12d of the liquid crystal panel 12, and includes a panel mounting surface 31 on which the liquid crystal panel 12 is mounted. The panel mounting surface 31 is formed on the surface of the side wall portion 30b on the opposite side from the bottom plate portion 30a, and has an annular shape surrounding the light exiting surface 20a. The panel mounting surface 31 may be considered the portion that constitutes the outer peripheral end portion of the light exiting surface 20a of the backlight unit 20.

The panel mounting surface 31, as illustrated in FIG. 2, includes four side portions 32A, 32B, 32C, and 32D extending along the side portion 12d of the oblong liquid crystal panel 12. The panel mounting surface 31 is provided with recessed portions 35A, 35B, 35C, and 35D in corner portions 33A, 33B, 33C, and 33D between the long-side portions (one side portion) 32A, 32C forming the long sides and the short-side portions (the other side portion) 32B, 32D adjacent to the long-side portions 32A, 32C. That is, the recessed portions 35A to 35D are provided for the respective four corner portions 33A to 33D of the panel mounting surface 31. To the panel mounting surface 31, one fixing surface 41a of the fixing tape 40 is fixed, and the liquid crystal panel 12 is mounted via the fixing tape 40. In the following, the configuration of the fixing tape 40 is described, and then the configuration of the recessed portion 35 will be described.

Figure 5:
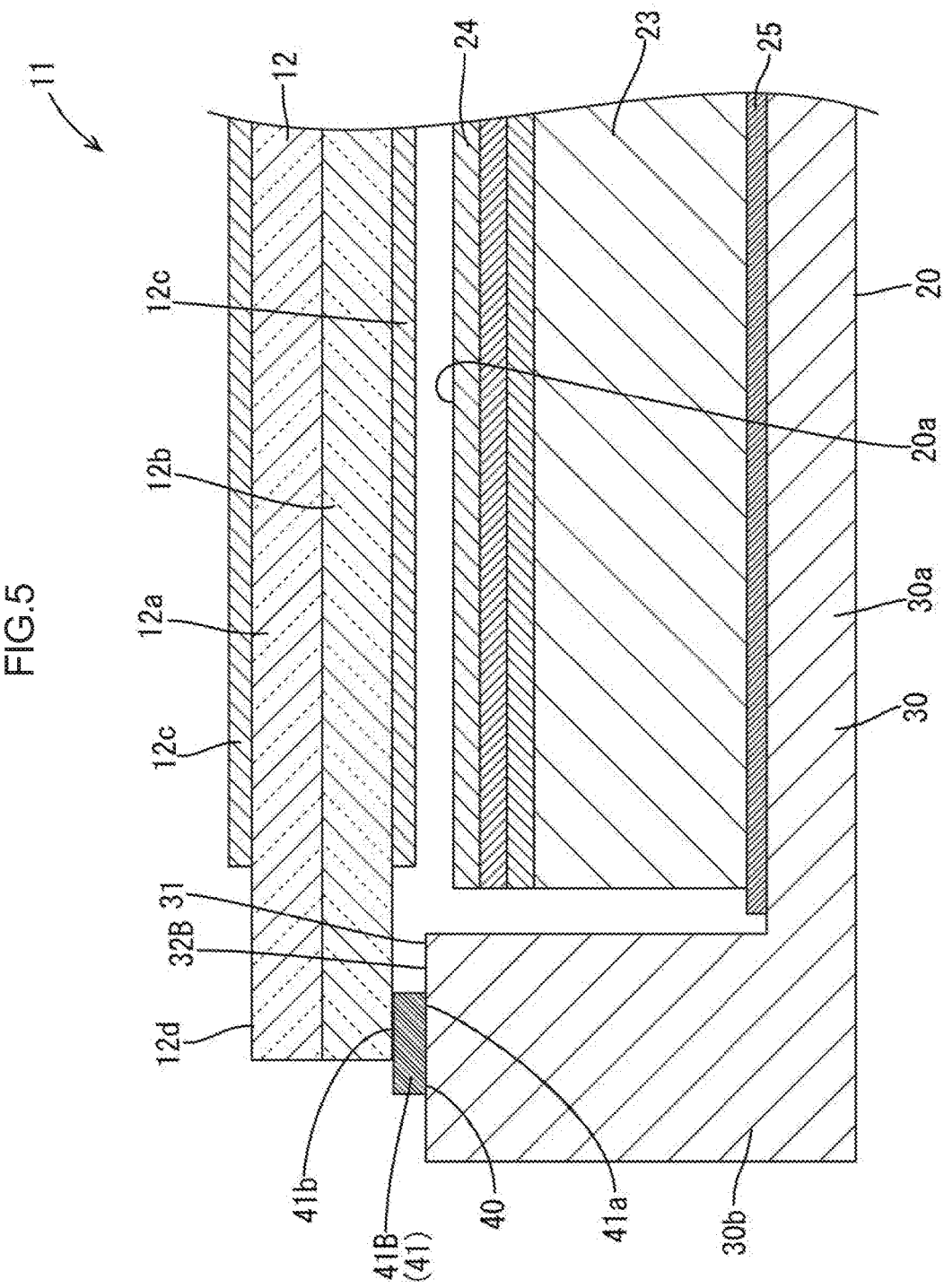
FIG. 5 is a cross sectional view of the liquid crystal module (corresponding to a section taken along line V-V of FIG. 4)

The fixing tape 40, as illustrated in FIG. 5, includes fixing surfaces 41a, 41b comprising adhesive layers which are not illustrated. One fixing surface 41a is fixed to the panel mounting surface 31, and the other fixing surface 41b is fixed to the glass substrate 12b of the liquid crystal panel 12. Thus, the fixing tape 40 provides the function of attaching the liquid crystal panel 12 to the housing member 30. The fixing tape 40 has light blocking property (such as by being black) and is therefore configured to suppress the unintended entry of the light from the backlight unit 20 into the liquid crystal panel 12 (particularly the outer peripheral end surface thereof). The fixing tape 40, as illustrated in FIG. 2, has an annular configuration in which a plurality of longitudinal unit fixing tapes 41 having fixing surfaces 41a, 41b on the front and rear surfaces are joined. The fixing tape 40 comprises one fixing surface 41a fixed to the panel mounting surface 31, and a plurality of unit fixing tapes 41 joined to each other at the position overlapping with the recessed portion 35.

In the following description, the four unit fixing tapes 41, when distinguished from each other, will be respectively referred to as unit fixing tapes 41A to 41D. The four unit fixing tapes 41, when referred to collectively, will be referred to as the unit fixing tape 41. The recessed portion 35, one end portion 42, the other end portion 43, and the overlapping area 45 will be respectively suffixed with the signs A to D when distinguished from each other. When the portions are referred to collectively, no such signs will be provided.

The fixing tape 40, as illustrated in FIG. 3, includes the plurality of unit fixing tapes 41A to 41D. The unit fixing tapes 41A, 41C are respectively disposed on the long-side portions 32A, 32C. The unit fixing tapes 41B, 41D are respectively disposed on the short-side portions 32B, 32D. Of the fixing tape 40, one end portion 42A of the unit fixing tape 41A and the other end portion 43B of the unit fixing tape 41B are overlapped with each other at the position overlapping with the recessed portion 35A, with the other fixing surface 41b and one fixing surface 41a aligned with each other (see FIG. 6). One end portion 42B, 42C, 42D of the unit fixing tapes 41B, 41C, 41D and the other end portions 43C, 43D, 43A of the unit fixing tapes 41C, 41D, 41A are similarly overlapped with each other at the position overlapping with the recessed portions 35B, 35C, 35D, with the other fixing surface 41b and one fixing surface 41a aligned with each other. The one end portion 42 and the other end portion 43 of the unit fixing tape 41 respectively mean the end portion positioned on one side and the end portion positioned on the other side in the circumferential direction of the backlight unit 20. The adjacent unit fixing tapes 41 are respectively joined to each other by means of the adhesive force of the one fixing surface 41a and the other fixing surface 41b at the one end portion 42 and the other end portion 43 thereof.

The unit fixing tapes 41A to 41D, as illustrated in FIG. 2 and FIG. 3, have flexibility and respectively form an oblong tape shape in a plan view extending along the side portions 32A to 32D of the panel mounting surface 31. Specifically, the unit fixing tapes 41A to 41D have a width dimension on the order of from 0.2 mm to 2 mm, and a length dimension comprising the dimension of the inner peripheral portion of the respective side portions 32A to 32D of the panel mounting surface 31 to which an overlapping margin that is twice the width dimension (on the order of from 0.4 mm to 4 mm) is added. The unit fixing tapes 41A to 41D have a thickness dimension on the order of from 5 μm to 50 μm. The unit fixing tape 41A and the unit fixing tape 41B, the unit fixing tape 41B and the unit fixing tape 41C, the unit fixing tape 41C and the unit fixing tape 41D, and the unit fixing tape 41D and the unit fixing tape 41A are respectively overlapped with each other with the corner portions thereof aligned with each other. In this way, the configuration is obtained in which the unit fixing tapes are overlapped with each other in respectively overlapping areas 45A, 45B, 45C, 45D which are square in a plan view. In the overlapping areas 45A to 45D, the unit fixing tapes 41A, 41C are positioned on the panel mounting surface 31 side (the opposite side from the liquid crystal panel 12 side), and the unit fixing tapes 41B, 41D are disposed on the liquid crystal panel 12 side. The unit fixing tape 41 is in a state in which a part of the overlapping area 45, i.e., both ends 42A, 43A and 42C, 42C of the unit fixing tapes 41A, 41C positioned on the panel mounting surface 31 are respectively accommodated in the recessed portions 35A to 35D.

Figure 6:
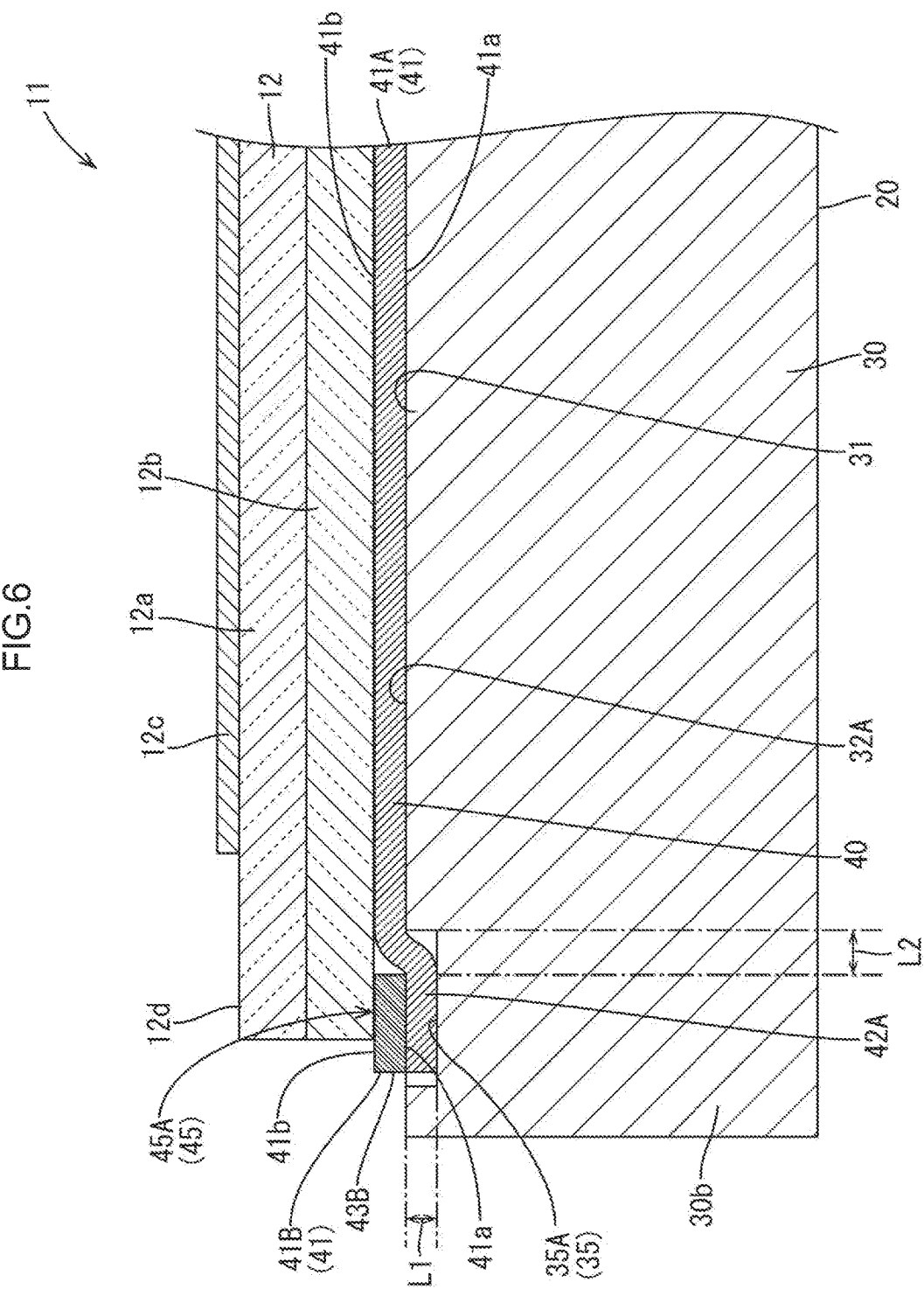
FIG. 6 is a cross sectional view of the liquid crystal module (corresponding to a section taken along line VI-VI of FIG. 4)

The recessed portion 35, as illustrated in FIG. 6, has a depth dimension L1 equivalent to the thickness dimension of the unit fixing tapes 41A, 41C that are disposed on the panel mounting surface 31 side among the four unit fixing tapes 41A to 41D. The recessed portion 35 has a square shape in a plan view in which the overlapping area 45 can be accommodated. Specifically, the recessed portion 35 is disposed with a predetermined clearance with respect to the overlapping area 45. Particularly, the recessed portion 35 has a clearance L2 on the side of the long-side portions 32A, 32C for permitting the bending of the unit fixing tapes 41A, 41C, such that the one end portions 42A, 42C positioned closer to the end than the bent portion of the unit fixing tapes 41A, 41C can be accommodated in the recessed portion 35. In the present embodiment, the recessed portion 35 is closed toward the outside of the housing member 30, and has outer peripheral sides thereof surrounded by outer side wall portion 30b. The configuration makes it possible to suppress the leakage of light from the recessed portion 35 out of the housing member 30, and also suppress the entry of external foreign matter into the housing member 30 via the recessed portion 35.

A method for manufacturing the liquid crystal display device 10 (liquid crystal module 11) will be described. The method for manufacturing the liquid crystal display device 10 (liquid crystal module 11) includes: a fixing member disposing step of disposing the fixing tape 40 with respect to the housing member 30; a protection member attaching step of attaching, after the fixing member disposing step, a protection member 51 for protecting the light exiting surface 20a of the backlight unit 20 to the backlight unit 20; and a panel mounting step of mounting the liquid crystal panel 12 to the backlight unit 20. In the present manufacturing method, a backlight unit package 50 is manufactured as an intermediate product between the protection member attaching step and the panel mounting step.

The backlight unit package 50, as illustrated in FIG. 3, is provided with the backlight unit 20 including the fixing tape 40, and the protection member 51 attached to the fixing tape 40 to protect the light exiting surface 20a of the backlight unit 20. That is, the backlight unit package 50 has the configuration in which the backlight unit 20 configuring the liquid crystal display device 10 is covered with the protection member 51. The configuration makes it possible, when handling the backlight unit 20 (for storage, transfer and the like), to prevent the problem of foreign matter, such as dust, becoming attached to the light exiting surface 20a of the backlight unit 20. The protection member 51 is subjected to releasable processing or attached to the other fixing surface 41b of the fixing tape 40 indirectly via a separate adhesive layer having weak adhesive force, as appropriate. Thus, the protection member 51 is attached to the backlight unit 20 so as to be peelable from the other fixing surface 41b.

In the fixing member disposing step, as illustrated in FIG. 2 and FIG. 3, first, the unit fixing tapes 41A, 41C to be respectively disposed on the long-side portions 32A, 32C are arranged in a straight line shape, and the one fixing surface 41a thereof is fixed to the panel mounting surface 31. Then, the unit fixing tapes 41B, 41D to be respectively disposed on the short-side portions 32B, 32D are arranged in a straight line shape, and the one fixing surface 41a thereof is fixed to the panel mounting surface 31. In this way, the plurality of unit fixing tapes 41A to 41D are disposed in a straight line shape along the respective side portions 32A to 32D, and therefore have high disposition accuracy. Thereafter, the one end portion 42 and the other end portion 43 of the unit fixing tapes 41 adjacent to each other are joined at the position overlapping with the recessed portion 35, whereby the annular fixing tape 40 is configured and the fixing tape 40 is completely disposed.

In the protection member attaching step, as illustrated in FIG. 3, the protection member 51, which may have the same outer shape as the outer shape of the backlight unit 20 or an outer shape slightly larger than the outer shape of the backlight unit 20 is attached to the other fixing surface 41b of the fixing tape 40. In the state in which the protection member 51 is attached to the backlight unit 20, the fixing tape 40 is closely attached to the housing member 30 and the protection member 51 without a gap in the circumferential direction thereof. Accordingly, after the protection member attaching step and before the protection member 51 is peeled, the problem of foreign matter, such as dust, entering the light exiting surface 20a side of the backlight unit 20 via a gap and the like at the fixing tape 40 can be suppressed.

In the panel mounting step, the protection member 51 attached to the backlight unit 20 is peeled to expose the other fixing surface 41b of the fixing tape 40, and the liquid crystal panel 12 is fixed to the other fixing surface 41b. In this way, the liquid crystal panel 12 is affixed to the backlight unit 20 via the fixing tape 40.

In the following, the operation/effects of the backlight unit 20 and the liquid crystal display device 10 according to the present embodiment will be described.

The backlight unit 20 according to the present embodiment is provided with: the LEDs 21; the optical sheets 24 including the light exiting surface 20a through which light rays from the LEDs 21 exit; the housing member 30 in which the LEDs 21 and the optical sheets 24 are housed, the housing member 30 including the annular panel mounting surface 31 which surrounds the light exiting surface 20a and on which the liquid crystal panel 12 irradiated with the light from the light exiting surface 20a is mounted, the housing member 30 including the recessed portion 35 recessed in the panel mounting surface 31; and the fixing tape 40 for attaching the liquid crystal panel 12 to the housing member 30, the fixing tape 40 being configured in an annular shape by joining a plurality of unit fixing tapes 41A to 41D having a longitudinal shape and including the fixing surfaces 41a, 41b on the front and rear surfaces, one fixing surface 41a being fixed to the panel mounting surface 31, wherein the plurality of unit fixing tapes 41A to 41D are joined at the positions overlapping with the recessed portions 35A to 35D.

In the backlight unit 20 according to the present embodiment, because the fixing tape 40 has an annular shape comprising the longitudinal unit fixing tapes 41A to 41D joined to each other, the amount of material that will be discarded for forming the fixing tape 40 can be decreased, and the fixing tape 40 can be accurately disposed with respect to the housing member 30. Specifically, as the size of the liquid crystal display device 10 is increased from being small (such as up to 6 inches) to medium (7 inches or more), the amount of material of the fixing tape 40 used in the backlight unit 20 that will be discarded increases, and the disposition accuracy of the fixing tape 40 tends to deteriorate. In the present embodiment, such problems can be avoided.

In addition, in the backlight unit 20 according to the present embodiment, the annular configuration is obtained by joining the longitudinal unit fixing tapes 41A to 41D. Accordingly, the fixing tape 40 is not susceptible to the formation of gap, and the problem of the entry of foreign matter into the light exiting surface 20a positioned inwardly of the fixing tape 40 (housing member 30) can be suppressed. In recent years, in the process of manufacturing the liquid crystal display device 10, it has become increasingly common to attach the protection member 51 to the backlight unit 20 such that the backlight unit 20 can be handled as the backlight unit package 50. In the present embodiment, when in the state of the backlight unit package 50, the entry of foreign matter laterally can also be suppressed in a preferable manner. Thus, it is not necessary to adopt a complicated countermeasure, such as wrapping the backlight unit with a protection member in the form of a sheet to suppress the lateral entry of foreign matter. Accordingly, the manufacturing process for the liquid crystal display device 10 can be simplified.

Moreover, the unit fixing tapes 41A to 41D are joined at the position overlapping with the recessed portions 35A to 35D of the panel mounting surface 31. Accordingly, the other fixing surface 41b of the fixing tape 40 (the fixing surface 41b affixed to the liquid crystal panel 12) can be made flat, and the liquid crystal panel 12 can be affixed to the housing member 30 in a preferable manner. Specifically, if the annular fixing tape 40 were to be attached to a housing member having no recessed portion, the thickness of the fixing tape 40 would be twice the thickness of the unit fixing tapes 41 only in the overlapping area 45, resulting in a greater thickness compared with the other areas. As a result, in areas other than the overlapping area 45 of the fixing tape 40, the liquid crystal panel 12 would be located above the other fixing surface 41b, possibly preventing the entire faces of the other fixing surface 41b from becoming attached to liquid crystal panel 12. In the present embodiment, because a part of the overlapping area 45 (such as one of the unit fixing tapes 41A, 41C) is accommodated in the recessed portion 35, generally the entire surface of the other fixing surface 41b of the fixing tape 40 can become attached to the liquid crystal panel 12, thus ensuring a sufficient bonding force.

Further, in the backlight unit 20 according to the present embodiment, because the other fixing surface 41b of the fixing tape 40 (the fixing surface 41b affixed to the panel) is flat, the display quality of the liquid crystal panel 12 can be increased. Specifically, if the other fixing surface 41b of the fixing tape 40 were not flat, the flatness of the liquid crystal panel 12 would be compromised in conformity with the other fixing surface 41b, and display unevenness (such as color unevenness) may be caused in an image and the like. In contrast, in the present embodiment, the development of such problem can be suppressed.

Further, in the present embodiment, the liquid crystal panel 12 has a polygonal shape; the panel mounting surface 31 includes a plurality of side portions 32A to 32D extending along the side portion 12d of the liquid crystal panel 12; the recessed portion 35A (35B, 35C, 35D) is provided at the corner portion 33A (32B, 32C, 32D) between one side portion 32A (32B, 32C, 32D) of the panel mounting surface 31 and the other side portion 32B (32C, 32D, 32A) thereof adjacent to the one side portion 32A (32B, 32C, 32D); the fixing tape 40 includes a plurality of unit fixing tapes 41A to 41D of which one unit fixing tape 41A (41B, 41C, 41D) is disposed on one side portion 32A (32B, 32C, 32D) with the other unit fixing tape 41B (41C, 41D, 41A) being disposed on the other side portion 32B (32C, 32D, 32A). In this configuration, the one unit fixing tape 41A (41B, 41C, 41D) and the other unit fixing tape 41B (41C, 41D, 41A) can be arranged in a straight line shape respectively along the one side portion 32A (32B, 32C, 32D) and the other side portion 32B (32C, 32D, 32A), allowing the fixing tape 40 to be accurately disposed with respect to the panel mounting surface 31, and also allowing the other fixing surface 41b to be flat in a preferable manner.

In the present embodiment, the recessed portions 35A to 35D are provided for the respective corner portions 33A to 33D of the panel mounting surface 31, and the fixing tape 40 includes the plurality of unit fixing tapes 41A to 41D respectively disposed on the side portions 32A to 32D of the panel mounting surface 31. In this configuration, the annular configuration of the fixing tape 40 along the polygonal panel mounting surface 31 comprising the side portions 32A to 32D can be achieved in a preferable manner.

In the present embodiment, the recessed portions 35A to 35D have a depth dimension equivalent to the thickness dimension of the unit fixing tapes 41A, 41C among the plurality of unit fixing tapes 41A to D that are disposed on the panel mounting surface 31 side. In this configuration, the other fixing surface 41b of the fixing tape 40 can be made flat in a preferable manner.

In the present embodiment, the fixing tape 40 includes the one unit fixing tape 41A (41B, 41C, 41D) and the other unit fixing tape 41B (41C, 41D, 41A) which respectively have an oblong tape shape in a plan view, and which are overlapped upon each other with the corner portions thereof being aligned with each other in the overlapping areas 45A to 45D that are rectangular in a plan view, and the recessed portions 35A to 35D have a rectangular shape in a plan view so as to accommodate the overlapping areas 45A to 45D. In this configuration, a sufficient overlapping margin for the one unit fixing tape 41A (41B, 41C, 41D) and the other unit fixing tape 41B (41C, 41D, 41A) can be ensured. In addition, because the overlapping areas 45A to 45D are accommodated in the recessed portions 35A to 35D having the same shape in a plan view, the development of a gap between the fixing tape 40 and the panel mounting surface 31 due to the provision of the recessed portions 35A to 35D can be suppressed.

In the present embodiment, the housing member 30 includes the bottom plate portion 30a on which the optical sheets 24 is mounted, and the frame-shaped side wall portion 30b rising from the outer peripheral end portion of the bottom plate portion 30a. The panel mounting surface 31 is formed on the surface of the side wall portion 30b on the opposite side from the bottom plate portion 30a. In this configuration, the configuration of the panel mounting surface 31 extending around the light exiting surface 20a of the optical sheets 24 in the housing member 30 can be achieved in a preferable manner.

The liquid crystal display device 10 of the present invention is provided with the backlight unit 20, and the liquid crystal panel 12 which is a panel attached to the panel mounting surface 31 and which provides a display using the light from the backlight unit 20.

In the liquid crystal display device 10 according to the present invention, during the manufacture of the liquid crystal display device 10 manufactured by affixing the backlight unit 20 and the liquid crystal panel 12 to each other, the problem of foreign matter becoming attached to the light exiting surface 20a of the backlight unit 20 can be suppressed in a preferable manner. In addition, because the other fixing surface 41b of the fixing tape 40 (the fixing surface 41b affixed to the panel) is flat, the liquid crystal panel 12 can be affixed to the housing member 30 in a preferable manner.

Further, in the liquid crystal display device 10 according to the present invention, because the other fixing surface 41b of the fixing tape 40 (the fixing surface 41b affixed to the panel) is flat, the display quality of the liquid crystal panel 12 can be increased. Specifically, if the other fixing surface 41b of the fixing tape 40 were not flat, the flatness of the liquid crystal panel 12 would be compromised in conformity with the other fixing surface 41b, and display unevenness (such as color unevenness) may be caused in an image and the like. In the present embodiment, the development of such problem can be suppressed.

In the present embodiment, the liquid crystal panel 12 is provided with the glass substrate 12b, and the polarizing plate 12c attached to the surface of the glass substrate 12b on the backlight unit 20 side. The fixing tape 40 has the other fixing surface 41b fixed to the glass substrate 12b. Generally, the glass substrate 12b has a plate surface smoother than the polarizing plate 12c. Accordingly, the configuration can ensure a sufficient bonding force of the fixing tape 40 with respect to the liquid crystal panel 12.

In the present embodiment, the display panel employs the liquid crystal panel 12, and can be therefore preferably applied for various uses, such as portable information terminals.

<Second Embodiment>

Figure 7:
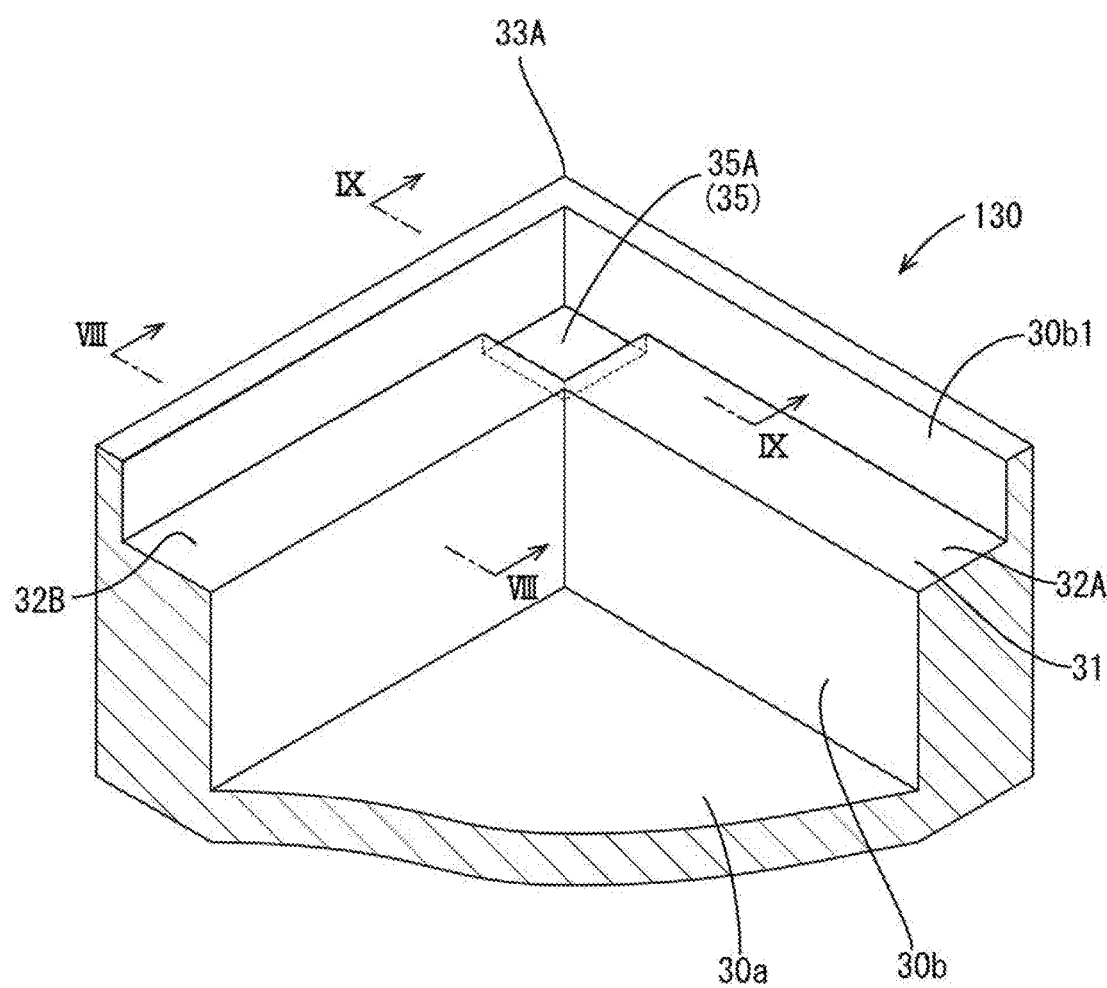
FIG. 7 is a perspective view around a corner portion of a housing member according to the second embodiment of the present invention.
Figure 8:
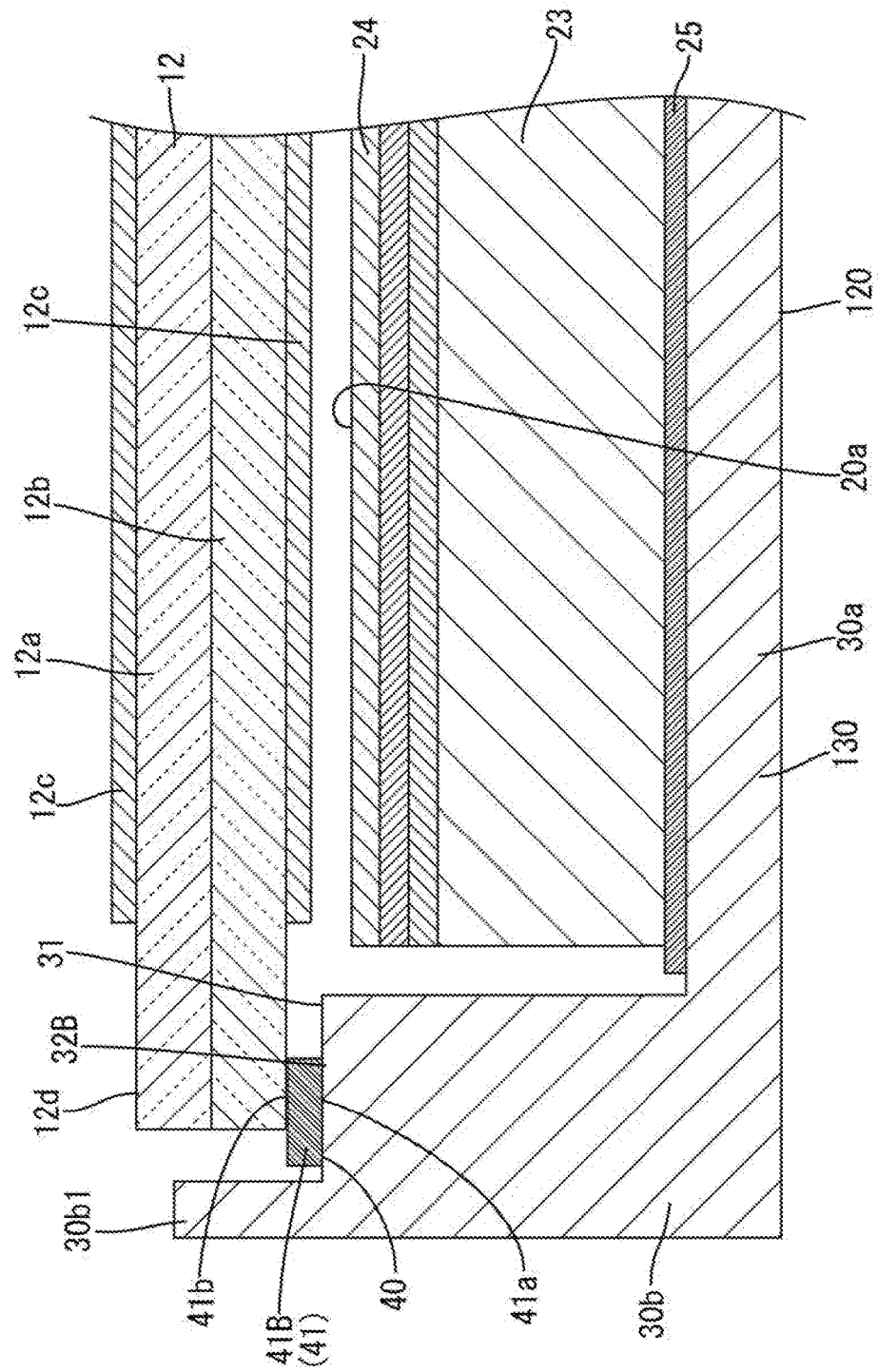
FIG. 8 is a cross sectional view of the liquid crystal module (corresponding to a section taken along line VIII-VIII of FIG. 7)
Figure 9:
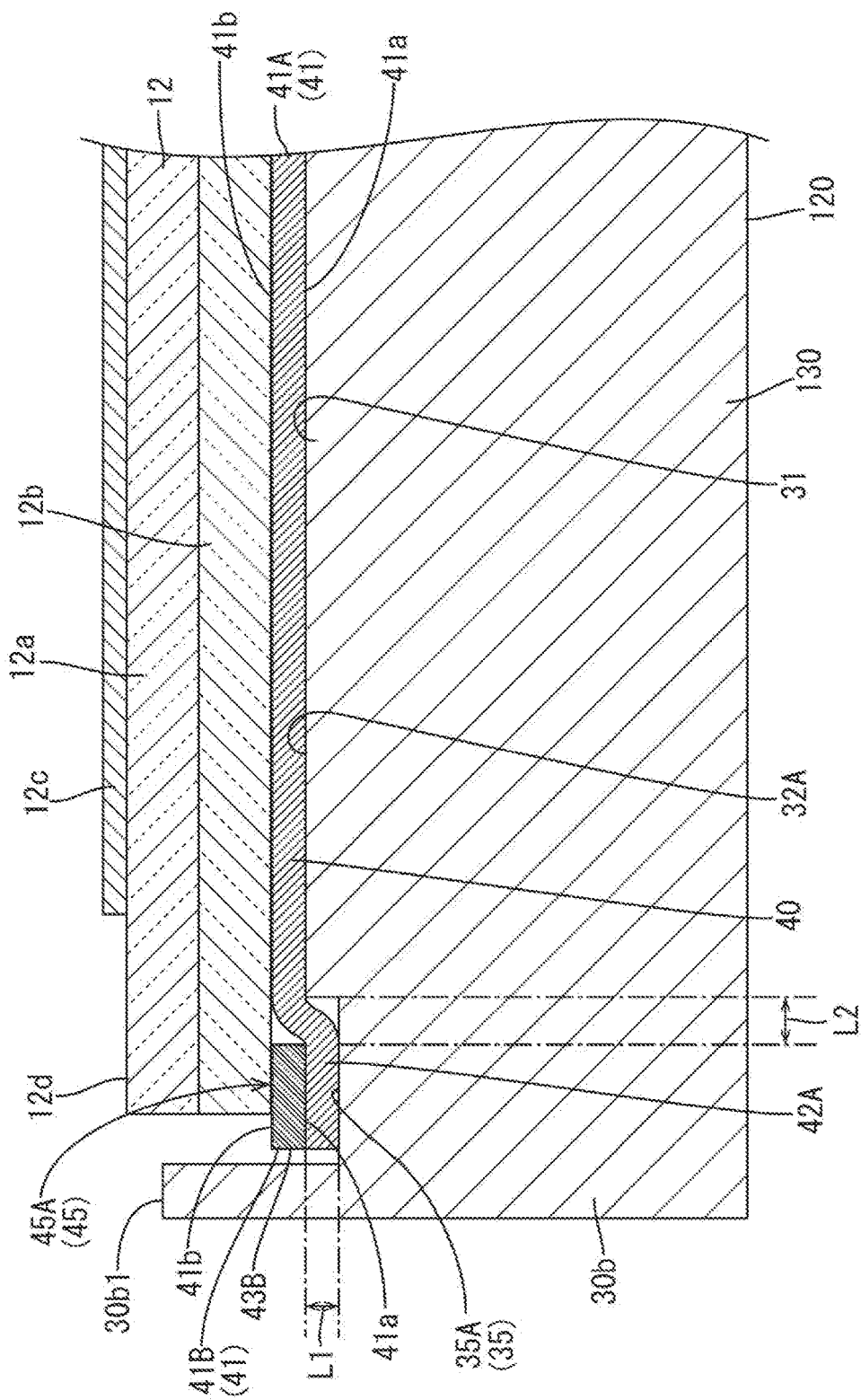
FIG. 9 is a cross sectional view of the liquid crystal module (corresponding to a section taken along line IX-IX of FIG. 7)

A second embodiment of the present invention will be described with reference to FIG. 7 to FIG. 9. In the second embodiment, a backlight unit 120 comprising a housing member 130 including a panel-side side wall portion 30b1 will be described by way of example. Redundant description of structures, operations, and effects similar to those of the first embodiment will be omitted.

A side wall portion 30b is provided with the panel-side side wall portion 30b1 which rises from a panel mounting surface 31 and which has a frame shape surrounding a liquid crystal panel 12. In other words, the side wall portion 30b is configured in a stepped shape such that the panel mounting surface 31 recedes toward a bottom plate portion 30a. In this configuration, because the panel-side side wall portion 30b1 is provided so as to surround the outer periphery of a fixing tape 40, foreign matter, such as dust, that would move inwardly into the housing member 130 can be blocked by the panel-side side wall portion 30b1. Thus, the problem of foreign matter becoming attached to a light exiting surface 20a can be suppressed in a preferable manner. Moreover, the liquid crystal panel 12 can be mounted so as to be held inside the panel-side side wall portion 30b1.

<Third Embodiment>

Figure 10:
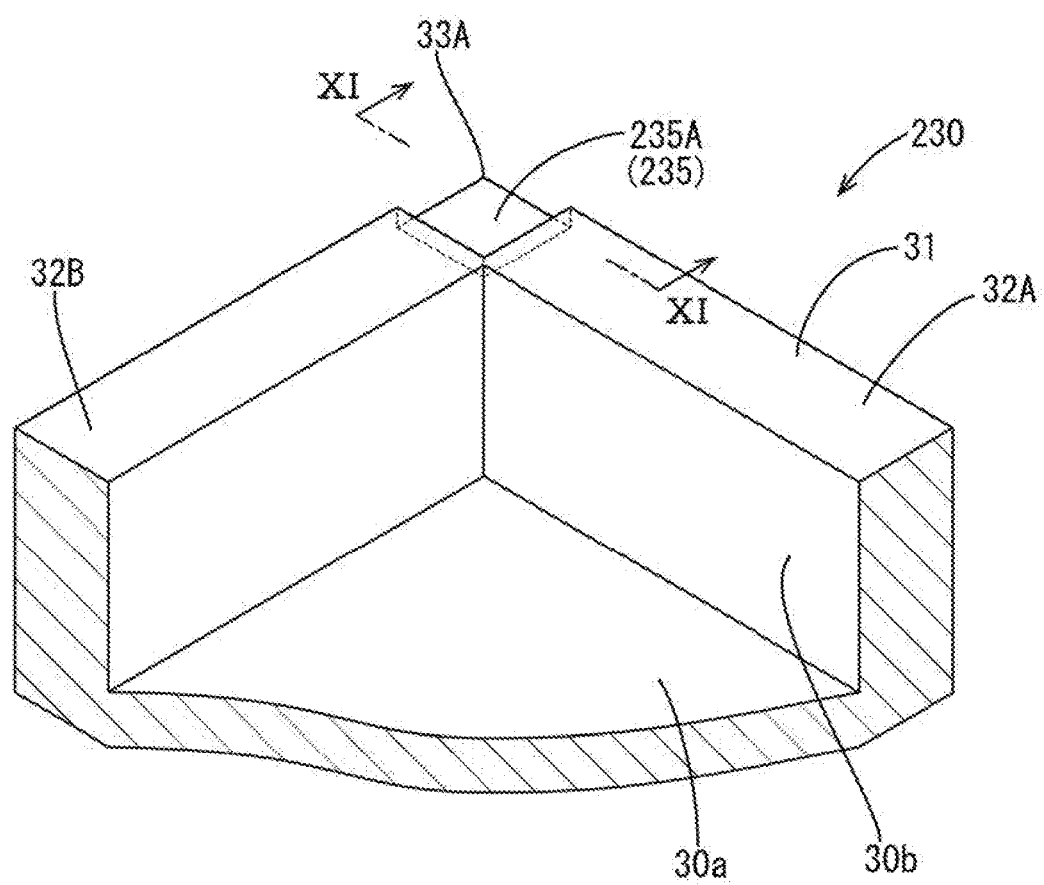
FIG. 10 is a perspective view around a corner portion of a housing member according to the third embodiment of the present invention.
Figure 11:
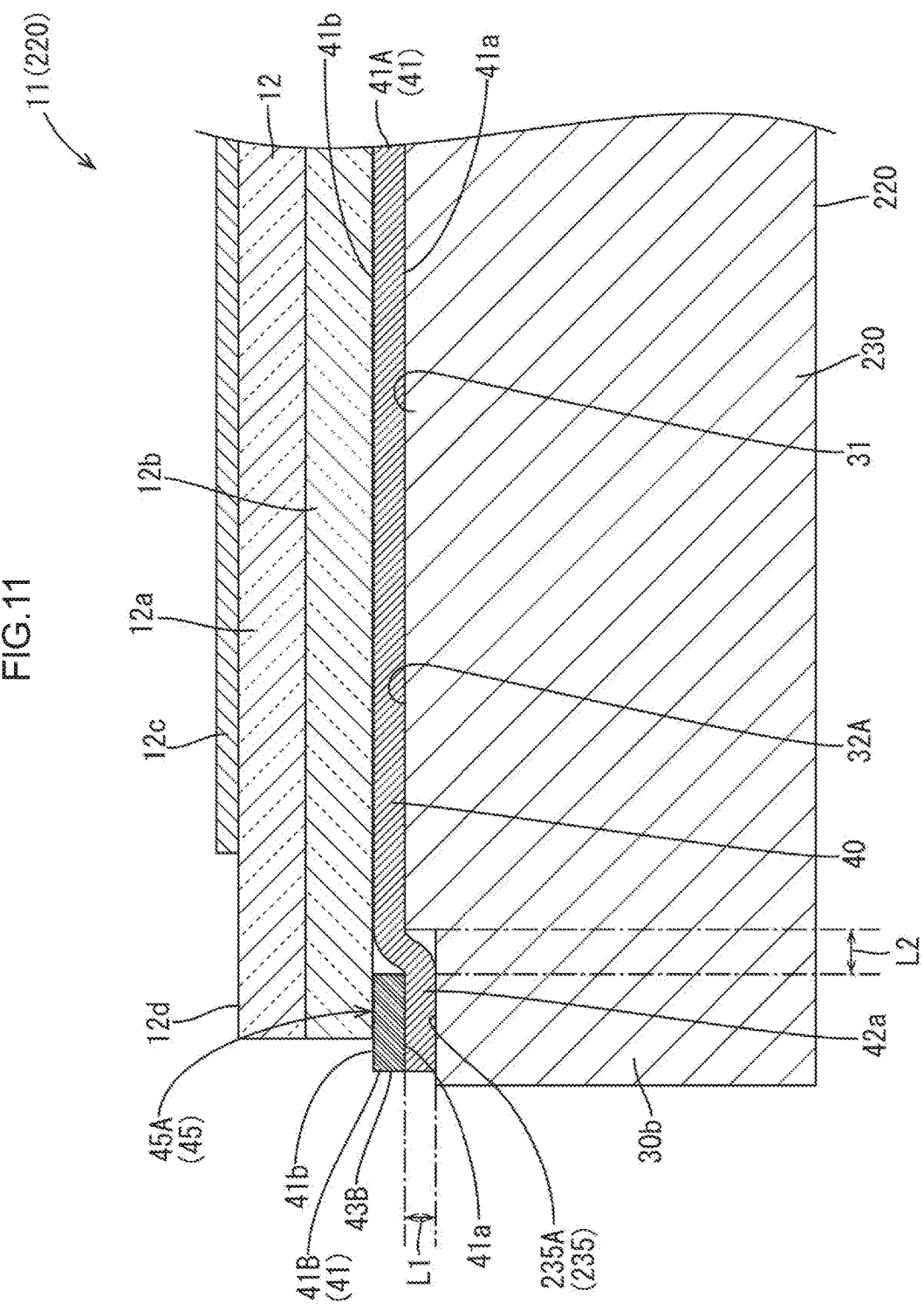
FIG. 11 is a cross sectional view of the liquid crystal module (corresponding to a section taken along line XI-XI of FIG. 10)

A third embodiment of the present invention will be described with reference to FIG. 10 or FIG. 11. In the third embodiment, a backlight unit 220 provided with a housing member 230 including a recessed portion 235 which is a modification of a recessed portion 35 will be described by way of example. Redundant description of structures, operations, and effects similar to those of the foregoing embodiments will be omitted.

The recessed portion 235 is open to the outside of the housing member 230, and a panel mounting surface 31 has a stepped shape receding toward the opposite side from a liquid crystal panel 12 side. In this configuration, even in a narrow frame design in which a fixing tape 40 is disposed to the edge of the outer peripheral end portion of the panel mounting surface 31, the unit fixing tapes 41A to 41D can be joined in a preferable manner in the position overlapping with the recessed portions 35A to 35D of the panel mounting surface 31.

<Fourth Embodiment>

Figure 12:
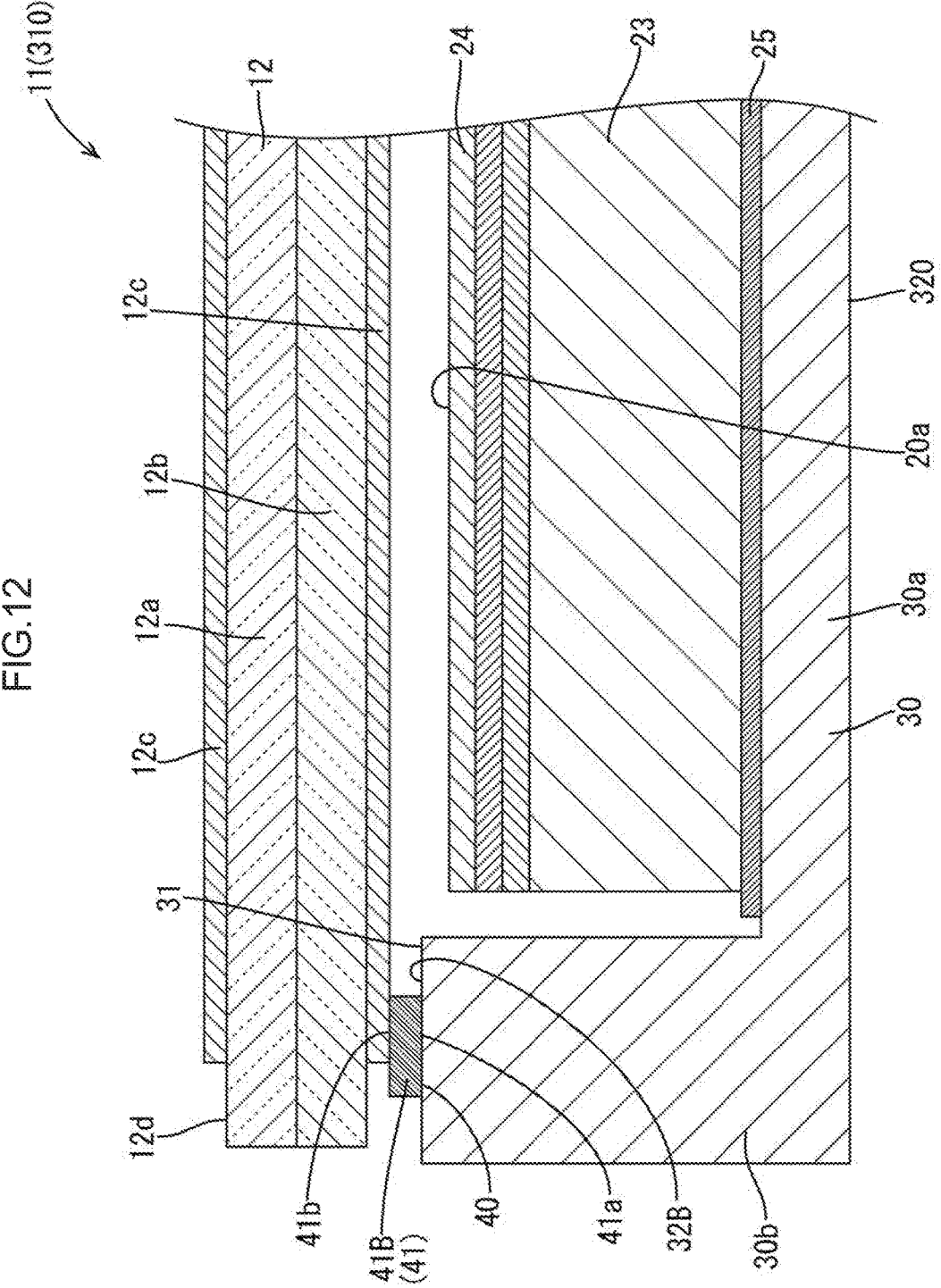
FIG. 12 is a cross sectional view of the liquid crystal module according to the fourth embodiment of the present invention.

A fourth embodiment of the present invention will be described with reference to FIG. 12. In the fourth embodiment, a backlight unit 320 and a liquid crystal display device 310 in which the other fixing surface 41b of a fixing tape 40 is fixed to a polarizing plate 12c will be described by way of example. Redundant description of structures, operations, and effects similar to those of the foregoing embodiments will be omitted.

Generally, the polarizing plate 12c does not have a high surface smoothness compared with a glass substrate 12b. Accordingly, when the fixing tape 40 is fixed to the polarizing plate 12c, the adhesive strength per unit area of the fixing tape 40 may be decreased compared with when fixed to the glass substrate 12b. Meanwhile, in the fixing tape 40 of the present embodiment, the flatness of the other fixing surface 41b is ensured, whereby a sufficient bonding force of the fixing tape 40 with respect to the polarizing plate 12c can be obtained. The configuration in which the polarizing plate 12c is disposed close to an outer peripheral end portion 12d of the liquid crystal panel 12 contributes to narrowing the frame of the liquid crystal display device 310.

<Other Embodiments>

The present invention is not limited to the above example embodiments explained in the above description and described with reference to the drawings. The following embodiments may be included in the technical scope of the present invention, for example.

(1) In the foregoing embodiments, the housing member is made from synthetic resin and configured from the bottom plate portion and the frame-shaped side wall portion rising from the outer peripheral end portion of the bottom plate portion. However, the configuration of the housing member is not limited to the above example. For example, the housing member may be made of metal plates and may be formed by assembling a chassis comprising the bottom plate portion and a synthetic resin frame comprising the side wall portion to each other.

(2) In the foregoing embodiments, the unit fixing members disposed on the long-side portions of the panel mounting surface are positioned on the panel mounting surface side. However, this does not suggest a limitation. For example, a configuration may be adopted in which the unit fixing members are attached successively along the circumferential direction of the panel mounting surface, and the unit fixing members are stacked and positioned on the panel mounting surface in the affixing order.

(3) Other than the foregoing embodiments, the arrangement and the number of the recessed portions and the fixing members that are disposed may be modified as appropriate. For example, a recessed portion may also be formed at a portion of the panel mounting surface other than a corner portion (intermediate portion of the side portion), and the joint of the fixing members may be formed at the position overlapping with such recessed portion.

(4) Other than the foregoing embodiments, the shape and configuration of the fixing member may be set as appropriate. For example, the width dimension of the unit fixing members may differ from each other, and, on the panel mounting surface, the width dimension of the unit fixing member disposed on the side portion on the side of the LED substrate may be greater than the width dimension of the unit fixing members disposed on the other side portions. The plurality of unit fixing members on the panel mounting surface may be such that the unit fixing member disposed on the side portion on the side of the LED substrate may have a straight line shape, while the unit fixing members disposed on the other side portions may form a U-shape.

(5) In the foregoing embodiments, the panel has a rectangular shape in a plan view, and the panel mounting surface includes a plurality of side portions extending along the side portion of the panel. The shapes of the panel and the panel mounting surface, however, are not limited to the above example configuration. The panel may have various other polygonal shapes, such as triangular, pentagonal, and hexagonal shapes, or shapes including a curved line, such as circular and elliptical shapes. In these cases, the unit fixing members may be configured to be overlapped with each other in an overlapping area having a parallelogram shape in a plan view.

(6) Other than the foregoing embodiments, the configuration of the backlight unit and the liquid crystal display device may be modified as appropriate. For example, while the liquid crystal panel has been configured from a glass substrate and a polarizing plate, the liquid crystal panel may be further provided with other optical films and the like. The backlight unit fixing member may be such that the other fixing surface is fixed to such other optical films.

(7) In the foregoing embodiments, the manufacturing process for the liquid crystal display device includes the protection member attaching step by way of example. However, even when the protection member attaching step is not included, the present invention can be applied and the effect of suppressing the entry of foreign matter into the light exiting surface can be expected.

(8) In the foregoing embodiments, the light source comprises LEDs. However, other light sources may be used.

(9) In the foregoing embodiments, the backlight device with which the liquid crystal display device is provided is of the edge-lit type by way of example. However, the present invention may include embodiments in which a direct backlight device is used.

(10) In the foregoing embodiments, the liquid crystal display device has been described by way of example in which a liquid crystal panel is used as a panel and a display panel. However, the present invention is also applicable to display devices in which other types of panels are used.

EXPLANATION OF SYMBOLS 10, 310 Liquid crystal display device (Display device)
12: Liquid crystal panel (Panel, Display panel)
12b: Substrate (Glass substrate)
12c: Polarizing plate
12d: Outer peripheral end portion (Side portion)
20, 120, 220, 320: Backlight unit
20a: Light exiting surface
21: LED (Light source)
24: Optical sheet (Optical member)
30, 130, 230: Backlight unit
30a: Bottom plate portion
30b: Side wall portion
30b1: Panel-side side wall portion
31: Panel mounting surface
32A, 32B, 32C, 32D: Side portion
33A, 33B, 33C, 33D: Corner portion
35, 35A, 35B, 35C, 35D, 235: Recessed portion
40: Fixing tape (Fixing member)
41, 41A, 41B, 41C, 41D: Unit fixing tape (Unit fixing member)
41a: One fixing surface
41b: The other fixing surface
45, 45A, 45B, 45C, 45D: Overlapping area

The invention claimed is:

1. A backlight unit comprising:
a light source;
an optical member including a light exiting surface through which light from the light source exits;
a housing member housing the light source and the optical member, the housing member including an annular panel mounting surface and a recessed portion recessed in the panel mounting surface, the annular panel mounting surface surrounding the light exiting surface and having a panel mounted thereto which is irradiated with the light from the light exiting surface; and
a fixing member for attaching the panel to the housing member, the fixing member being configured in an annular shape comprising a plurality of longitudinal unit fixing members joined to each other, the unit fixing members having fixing surfaces on front and rear surfaces thereof, wherein one of the fixing surfaces is fixed to the panel mounting surface, and the plurality of unit fixing members are joined at a position overlapping with the recessed portion, wherein
the panel has a polygonal shape,
the panel mounting surface includes a plurality of side portions extending along a side portion of the panel,
the recessed portion is provided at a corner portion between one side portion of the panel mounting surface and another side portion adjacent to the one side portion, and
among the plurality of unit fixing members of the fixing member, one unit fixing member is disposed on the one side portion, and another unit fixing member is disposed on the other side portion, wherein the one unit fixing member and the other unit fixing member of the fixing member each has an oblong tape shape in a plan view, and are overlapped, with the corner portions thereof being aligned with each other, in an overlapping area that is rectangular in a plan view; and the recessed portion has a rectangular shape in a plan view so as to accommodate at least a part of the overlapping area.

2. The backlight unit according to claim 1, wherein:
the recessed portion is provided for each corner portion of the panel mounting surface; and
the plurality of unit fixing members of the fixing member are disposed on each of the side portions of the panel mounting surface.

3. The backlight unit according to claim 1, wherein the recessed portion has a depth dimension equivalent to a thickness dimension of the unit fixing member among the plurality of unit fixing members that is disposed on the panel mounting surface side.

4. The backlight unit according to claim 1, wherein:
the housing member includes a bottom plate portion on which the optical member is mounted, and a frame-shaped side wall portion rising from an outer peripheral end portion of the bottom plate portion; and
the panel mounting surface is formed on a surface of the side wall portion on the opposite side from the bottom plate portion.

5. The backlight unit according to claim 4, wherein the side wall portion includes a frame-shaped panel-side side wall portion rising from the panel mounting surface and surrounding the panel.

6. A display device comprising:
the backlight unit according to claim 1; and
a display panel which is the panel attached to the panel mounting surface and which provides a display using the light from the backlight unit.

7. The display device according to claim 6, wherein:
the display panel comprises a glass substrate, and a polarizing plate attached to a surface of the glass substrate on the backlight unit side; and
the fixing member has the other fixing surface fixed to the glass substrate.

8. The display device according to claim 6, wherein:
the display panel comprises a glass substrate, and a polarizing plate attached to a surface of the glass substrate on the backlight unit side; and
the fixing member has the other the fixing surface fixed to the polarizing plate.

9. The display device according to claim 6, wherein the display panel is a liquid crystal panel in which liquid crystals are used.

10. A backlight unit comprising:
a light source;
an optical member including a light exiting surface through which light from the light source exits;
a housing member housing the light source and the optical member, the housing member including an annular panel mounting surface and a recessed portion recessed in the panel mounting surface, the annular panel mounting surface surrounding the light exiting surface and having a panel mounted thereto which is irradiated with the light from the light exiting surface; and
a fixing member for attaching the panel to the housing member, the fixing member being configured in an annular shape comprising a plurality of longitudinal unit fixing members joined to each other, the unit fixing members having fixing surfaces on front and rear surfaces thereof, wherein one of the fixing surfaces is fixed to the panel mounting surface, and the plurality of unit fixing members are joined at a position overlapping with the recessed portion, wherein the housing member includes a bottom plate portion on which the optical member is mounted, and a frame-shaped side wall portion rising from an outer peripheral end portion of the bottom plate portion; and the panel mounting surface is formed on a surface of the side wall portion on the opposite side from the bottom plate portion.

11. The backlight unit according to claim 10, wherein the side wall portion includes a frame-shaped panel-side side wall portion rising from the panel mounting surface and surrounding the panel.

* * * * *